(12) United States Patent
Markham

(10) Patent No.: US 10,204,531 B2
(45) Date of Patent: Feb. 12, 2019

(54) INJECTION DUMMY

(71) Applicant: Carebay Europe Ltd, Sliema (MT)

(72) Inventor: David Markham, Gloucester (GB)

(73) Assignee: Carebay Europe Ltd, Sliema (MT)

( * ) Notice: Subject to any disclaimer, the term of this patent is extended or adjusted under 35 U.S.C. 154(b) by 189 days.

(21) Appl. No.: 15/029,072

(22) PCT Filed: Oct. 8, 2014

(86) PCT No.: PCT/EP2014/071523
§ 371 (c)(1),
(2) Date: Apr. 13, 2016

(87) PCT Pub. No.: WO2015/055476
PCT Pub. Date: Apr. 23, 2015

(65) Prior Publication Data
US 2016/0232818 A1    Aug. 11, 2016

(30) Foreign Application Priority Data
Oct. 14, 2013  (SE) ........................................ 1351212

(51) Int. Cl.
*G09B 23/28*    (2006.01)
(52) U.S. Cl.
CPC .................. *G09B 23/285* (2013.01)
(58) Field of Classification Search
USPC .................. 434/262, 267, 268, 272
See application file for complete search history.

(56) References Cited

U.S. PATENT DOCUMENTS

| | | | | |
|---|---|---|---|---|
| 5,727,948 A | * | 3/1998 | Jordan | G09B 23/285 434/267 |
| 6,077,221 A | * | 6/2000 | Fowler, Jr. | A61B 17/0293 434/262 |
| 6,336,812 B1 | * | 1/2002 | Cooper | G09B 23/285 434/262 |
| 7,575,434 B2 | * | 8/2009 | Palakodeti | G09B 23/28 434/267 |
| 7,621,749 B2 | * | 11/2009 | Munday | A61M 5/427 434/262 |
| 7,988,451 B2 | * | 8/2011 | Battaglia, Jr. | G09B 23/285 434/262 |
| 8,100,695 B2 | * | 1/2012 | Duprez | G09B 23/30 434/267 |

(Continued)

FOREIGN PATENT DOCUMENTS

WO    2011/098129 A1    8/2011

OTHER PUBLICATIONS

EPO, Int'l Search Report in PCT/EP2014/071523, dated Feb. 16, 2015.

*Primary Examiner* — Kurt Fernstrom
(74) *Attorney, Agent, or Firm* — Piedmont Intellectual Property

(57) ABSTRACT

Herein an injection dummy (2) disclosed. The injection dummy comprising a body (4) and a lid (6), wherein the body (4) forms a bowl (8) for receiving and holding a liquid, the bowl (8) comprising side surfaces (10) and a bottom surface (12), and wherein the lid (6) comprises a resilient material adapted to be penetrated by a needle. The lid (6) is adapted to be in liquid sealing contact with the body (4) by the resilient material abutting against the side surfaces (10) of the bowl (8).

17 Claims, 3 Drawing Sheets

(56) References Cited

U.S. PATENT DOCUMENTS

| | | | | |
|---|---|---|---|---|
| D673,218 S | * | 12/2012 | Paslawski | D19/62 |
| 8,342,853 B2 | * | 1/2013 | Cohen | G09B 23/32 |
| | | | | 434/267 |
| 8,408,920 B2 | * | 4/2013 | Speller | G09B 23/285 |
| | | | | 434/267 |
| 8,684,744 B2 | * | 4/2014 | Selz | G09B 23/28 |
| | | | | 434/267 |
| 9,033,713 B2 | * | 5/2015 | Nelson | G09B 23/285 |
| | | | | 434/272 |
| 2009/0035737 A1 | | 2/2009 | Battaglia, Jr. | |
| 2012/0301857 A1 | | 11/2012 | Selz et al. | |
| 2017/0334112 A1 | * | 11/2017 | Valderrama | B65D 41/06 |

\* cited by examiner

INJECTION DUMMY

TECHNICAL FIELD

Embodiments disclosed herein relate to an injection dummy for practicing and demonstrating needle injections.

BACKGROUND

A syringe with a needle is commonly used to inject e.g. a medicament into a patient. Users of such syringes may need to practice injecting a medicament. In other situations a user may require to demonstrate an injection device comprising a needle. A dummy or training pad specifically designed for such purposes may be injected in such cases.

US2012/301857 discloses an injection training dummy, including a) a three-dimensional shell member which can be penetrated by an injection needle, and b) a closure member detachably interconnected with the shell member, wherein c) the shell member and the closure member constitute a chamber into which liquid can be injected through the injection needle, and d) the shell member and the closure member are designed such that they do not absorb the liquid. The closure member is flat and round, and is embraced by a lip of the shell member. To empty the chamber from liquid, the injection training dummy has to be turned over and the closure member has to be removed. Thus, the emptying of the injection training dummy may be messy and the liquid may be easily spilled. In practice, an absorbing material such as cotton is placed in the chamber to soak up the liquid.

U.S. Pat. No. 7,988,451 discloses an injection training pad that allows a user to practice intradermal, subcutaneous and intramuscular injections all on the same device. The injection training pad includes a container having an open top and a closed bottom. A lid having a hole removably engages the open top of the container. The pad also includes a retaining member having a base with at least one leg. At least a portion of the retaining member is disposed within the container. A cap having a flange is positioned between the retaining member and the lid, and a cushion is positioned between the retaining member and the cap. The cushion is arranged to soak up liquid. Excess liquid is collected in the container. Since three different types of injections may be practised on the injection training pad, the design of the injection training pad is complicated.

SUMMARY

It is an object to provide an injection dummy which at least alleviates the above mentioned problems.

According to an aspect, this is achieved by an injection dummy comprising a body and a lid, wherein the body forms a bowl for receiving and holding a liquid, the bowl comprising side surfaces and a bottom surface, and wherein the lid comprises a resilient material adapted to be penetrated by a needle. The lid is adapted to be in liquid sealing contact with the body by the resilient material abutting against the side surfaces of the bowl.

Since the lid seals directly against the body in the bowl, which is adapted to receive and hold liquid, an uncomplicated design of the injection dummy is achieved. Moreover, since the bowl is arranged in the body and the lid is adapted to be penetrated by a needle, the injection dummy need not be turned over when removing the lid to empty the injection dummy from liquid. As a result, the above mentioned object is achieved.

The bowl may form the only liquid receiving and holding part of the injection dummy.

According to embodiments, the bowl may comprise only concave transitions between the side surfaces, as well as between the side surfaces and the bottom surface. In this manner, no sharp corner are formed inside the bowl. The bowl thus, may be easily cleaned from any remaining liquid after emptying of the bowl.

According to embodiments, the side surfaces may extend substantially perpendicularly to the bottom surface. In this manner, the lid may be easily removed while still having good liquid sealing properties. Also, the body may be easily manufactured.

According to embodiments, a recess in the body may form a spout connected to the bowl. The spout may be adapted to guide a liquid being poured out of the bowl when the lid has been removed from the body. In this manner, liquid may be easily emptied from the bowl without spilling.

According to embodiments, the lid may comprise a graspable lip extending along at least a portion of the recess. In this manner, a user may easily remove the lid from the body by grasping and pulling on the lip.

According to embodiments, at least a portion of the body may be made from a transparent material. In this manner, injection of a liquid into the bowl may be observed from an outside of the injection dummy.

According to embodiments, the body may comprise a first outer friction surface. At least a portion of the first outer friction surface may form an outer lateral surface of the body. In this manner, a user of the injection dummy may securely hold the injection dummy while injecting a liquid via a needle into the bowl.

According to embodiments, the body may comprise a second outer friction surface. The second outer friction surface may be arranged substantially opposite to the opening. In this manner, the injection dummy may securely stand on a supporting surface during use of the injection dummy.

According to embodiments, a portion of the body may comprise an outer elastic member, the outer elastic member comprising the first outer friction surface and/or the second outer friction surface. In this manner, the first and second outer friction surfaces may easily be provided on the injection dummy.

According to embodiments, the lid may comprise a first position indicator and the body may comprise a second position indicator. The first position indicator and the second position indicator may be adapted to be aligned when the lid is positioned on the body. In this manner, it may be ensured that a user positions the lid correctly on the body.

Further features of, and advantages will become apparent when studying the appended claims and the following detailed description.

BRIEF DESCRIPTION OF THE DRAWINGS

Various aspects of embodiments, including their particular features and advantages, will be readily understood from the example embodiments discussed in the following detailed description and the accompanying drawings, in which.

DETAILED DESCRIPTION

Aspects of example embodiments will now be described more fully. Like numbers refer to like elements throughout. Well-known functions or constructions will not necessarily be described in detail for brevity and/or clarity.

Figure 1:
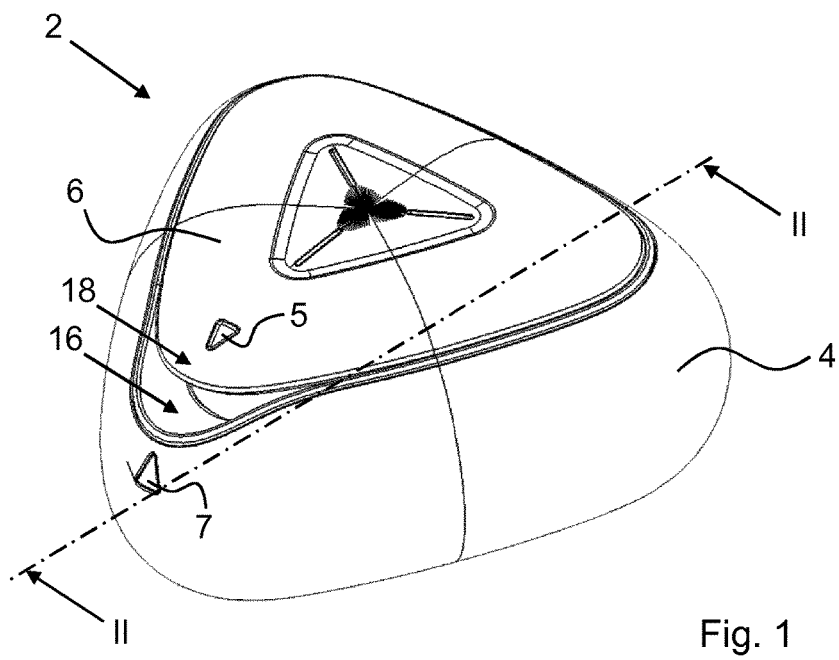
FIG. 1 illustrates an injection dummy according to embodiments.

FIG. 1 illustrates an injection dummy 2 according to embodiments. The injection dummy 2 comprises a body 4 and a lid 6. The lid 6 comprises a resilient material adapted to be penetrated by a needle, such as a needle of a syringe. The lid 6 is removable from the body 4.

The lid 6 comprises a first position indicator 5 and the body 4 comprises a second position indicator 7. The first position indicator 5 and the second position indicator 7 adapted to be aligned when the lid 6 is positioned on the body 4.

Figure 2:
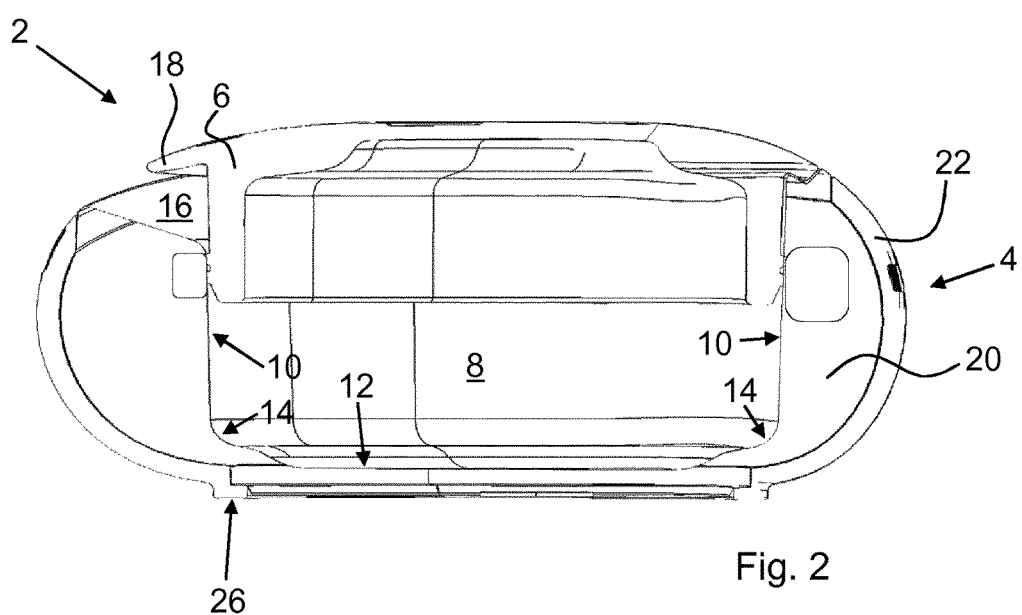
FIG. 2 illustrates a cross section through the injection dummy illustrated in FIG. 1.

FIG. 2 illustrates a cross section through the injection dummy 2 illustrated in FIG. 1 along the line II-II. The body 4 forms a bowl 8 for receiving and holding a liquid. Thus, a needle of a syringe may penetrate the lid 6 and a liquid from the syringe may be injected into the bowl 8. The bowl 8 comprises side surfaces 10 and a bottom surface 12. The lid 6 is arranged in liquid sealing contact with the body by the resilient material abutting against the side surfaces 10 of the bowl 8. Thus, liquid from the syringe may be enclosed in the bowl 8 by the lid 6. The side surfaces 10 form inner side surfaces in the body 4.

The bowl 8 comprises only concave transitions 14 between the side surfaces 10, as well as between the side surfaces 10 and the bottom surface 12. Similarly, any transitions in the bottom surface 12 and/or side surfaces 10 themselves are smooth so as not to form any sharp corners. Thus, when the bowl 8 is emptied, liquid will easily flow out of the bowl 8 without remaining in any sharp corners. Also, any remaining liquid is thus easily wiped out of the bowl 8.

The side surfaces 10 extend substantially perpendicularly to the bottom surface 12. The side surfaces 10 of the bowl 8 define an opening of the bowl 8. The opening is adapted to be closed by the lid 6. The opening faces upwardly during injection of a liquid through the lid 6. As illustrated in FIG. 2, the opening is closed by the lid 6. Also when emptying the bowl 8 from liquid received therein, the opening will face upwardly as the body 4 is tilted to pour the liquid out of the bowl 8. Thus, the injection dummy 2 may be used without any sponge or other liquid soaking element in the bowl 8.

A recess 16 is arranged at upper side of the body 4. The recess 16 in the body 4 forms a spout connected to the bowl 8. The spout is adapted to guide a liquid being poured out of the bowl 8 when the lid 6 has been removed from the body 4. In this manner, liquid may be easily emptied from the bowl 8 without spilling. The lid 6 comprises a graspable lip 18 extending along at least a portion of the recess 16, see also FIG. 1. Due to the recess 16 the lip 18 is easily graspable and for a user to pull on to remove the lid 6 from the body 4.

The body 4 may be formed from one piece of material. In these embodiments however, the body 4 comprises a bowl forming structure 20 and an outer elastic member 22.

Figure 3:
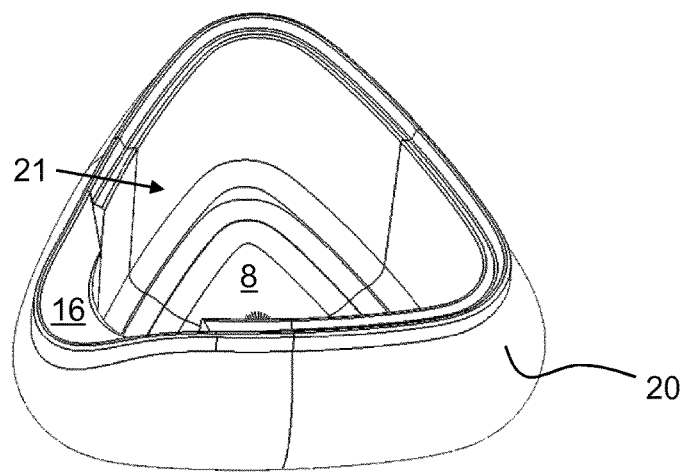
FIG. 3 illustrates a bowl forming structure.

FIG. 3 illustrates the bowl forming structure 20 of FIG. 2 in more detail. The bowl forming structure 20 may form a portion of the body 4 made from a transparent material. Examples of suitable transparent materials are for instance acrylic plastic material or glass. However, the bowl forming structure 20 may alternatively be made from a non-transparent material, such as a suitable thermoplastic material.

Since in FIG. 3 the lid is not illustrated, the opening 21 of the bowl 8 is clearly visible, as well as the recess 16, which forms the spout connected to the bowl 8.

Figure 4:
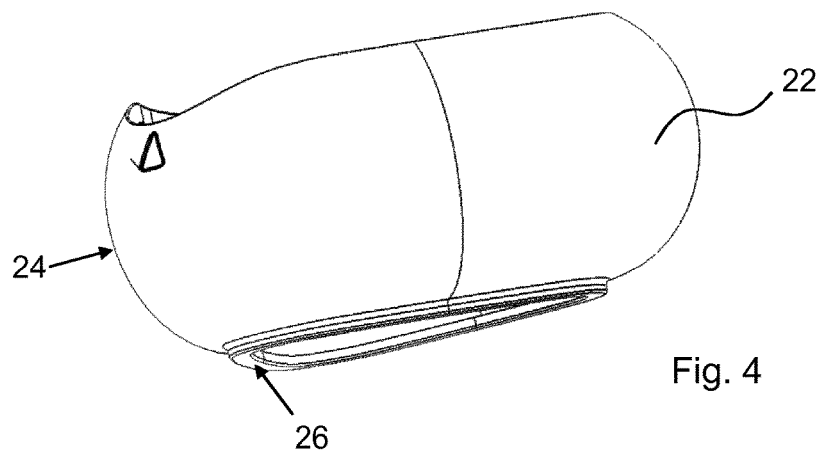
FIG. 4 illustrates an outer elastic member.

FIG. 4 illustrates the outer elastic member 22 of FIG. 2 in more detail. The outer elastic member 22 comprises a first outer friction surface 24 and a second outer friction surface 26. The first outer friction surface 24 forms an outer lateral surface of the body of the injection dummy. As can be seen in FIG. 2, the second outer friction surface 26 is arranged substantially opposite to the opening of the bowl 8. Accordingly, the second outer friction surface 26 forms the lowermost surface of the body 4. The first and second outer friction surfaces 24, 26 serve the purpose of ensuring that the injection dummy is securely positioned during use thereof. A user may get a secure grip around the injection dummy due to the first outer friction surface 24, and due to the second outer friction surface 26 the injection dummy may securely stand on a supporting surface.

The outer elastic member 22 may be elastic to such an extent that it is removable from the bowl forming structure of the body. The outer elastic member 22 may be held in place on the bowl forming structure by its elastic properties. Different designs of the outer elastic member 22 are foreseen, for instance may the outer elastic member be differently coloured or patterned to associate the injection dummy with a particular brand or maker of the injection dummy. The outer elastic member 22 may be manufactured from the same material as the lid, see below. Such material inherently provides a high friction outer surface for the first and second outer friction surfaces 24, 26.

Figure 5:
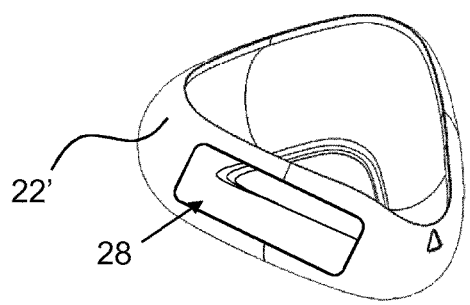
FIG. 5 illustrates a further embodiment of an elastic outer member.

FIG. 5 illustrates a further embodiment of an elastic outer member 22'. The difference between this elastic outer member 22' and the elastic outer member 22 illustrated in FIG. 4 is that this elastic outer member 22' is provided with an aperture 28. Thus, when the bowl forming structure 20 is formed from a transparent material, injection of the liquid through the lid into the bowl may be observed through the aperture 28.

Figure 6A:
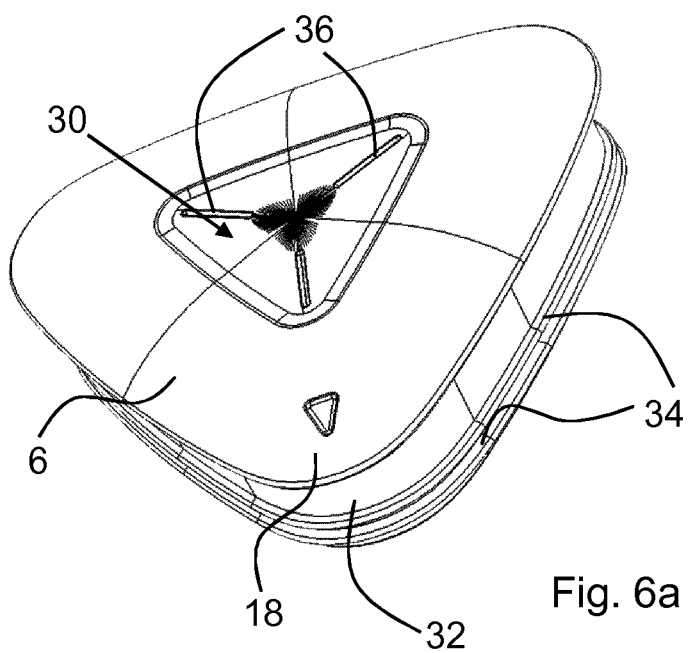
FIGS. 6a and 6b illustrate embodiments of a lid of an injection dummy.
Figure 6B:
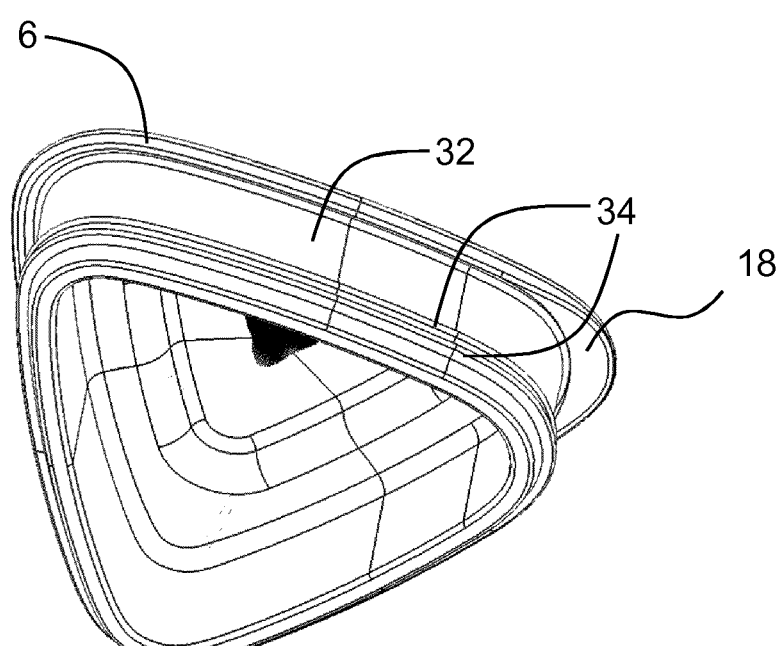

FIGS. 6a and 6b illustrate embodiments of a lid 6 of an injection dummy. The lid 6 may comprise a silicone material. In these embodiments, the entire lid 6 is formed from a silicone material. The silicone material may for instance be a silicone elastomer based on RHODORSIL MM 1870 U or RHODORSIL MM 1850 U from the manufacturer Rhodia Silicones s.a.s. Other silicone materials having similar properties may be used. Such properties may be a Hardness (Duromoter) (ASTM D 2240) of approximately 50-70, a Tensile strength, (Kgf/cm) (JIS K 6301 No. 3) of approximately 80, an Elongation at break (%) (JIS K 6301 No. 3) of approximately 300-450, a Tear strength, (Kgf/cm) (JIS K 6301 TYPE B) of approximately 21-23, and a Linear shrinkage (%) 200 C/4 hr of approximately 3.2-3.3%. A further alternative may be to use a thermoplastic elastomer (TPE) having similar properties.

The lid 6 comprises a penetration area 30 having a thickness of 1-2 mm. In this manner, the penetration area 30 provides a sensation similar to that of skin and muscle tissue when a user punctures the penetration area 30 with a needle. Moreover, a rupture caused by a needle in a material as specified above and with such thickness, closes up again in a liquid tight manner when the user removes the needle from the lid 6. Thus, the lid 6 may be punctured a large number of times before requiring to be replaced. Suitably the penetration area 30 may be arranged centrally on the lid.

The lid 6 comprises a rim 32. The rim 32 may have a thickness of 2-4 mm. In this manner, a stiff rim 32 to be positioned adjacent to side surfaces of the bowl of the injection dummy may be provided. The lid 6 may thus, maintain its shape when positioned on the body of the injection dummy closing the bowl. The liquid tight seal between the lid and the body may thus be achieved. The rim 32 may be provided with at least one flange 34 adapted to abut against the side surfaces of the bowl. In this manner, a liquid tight seal may be ensured. In these embodiments there are provided two flanges 34 on the rim 32. In the cross section of FIG. 2 the seal achieved by the flanges 34 is clearly illustrated.

The lid 6 is provided with indicative markings 36 indicating to a user where to insert a needle in the central penetration area 30. The lid 6 comprises a graspable lip 18.

This invention should not be construed as limited to the embodiments set forth herein. A person skilled in the art will realize that different features of the described embodiments may be combined to create embodiments other than those described herein, without departing from the scope of protection, as defined by the appended claims. It is also understood by those skilled in the art that when the body 4 is formed from one piece of material, that piece of material may be a transparent material. The outer elastic member may be provided with protrusions and/or depressions to improve the grip of a user around the injection dummy 2. Similarly, when the body 4 is formed from one piece of material, the outer side of the said piece may be provided with protrusions and/or depressions to improve the grip of a user around the injection dummy 2. In this manner a first outer friction surface and/or a second outer friction surface may be provided on a body 4 formed of one piece of material. The injection dummy 2 may for instance have a length and width of 5-20 cm and a height of 3-5 cm.

Although the description refers to example embodiments, many different alterations, modifications and the like will become apparent for those skilled in the art. The injection dummy 2 may have any other suitable shape than triangular as in the illustrated embodiments, for instance round or square. Therefore, it is to be understood that the foregoing is illustrative of various example embodiments and that the scope of protection is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. An injection dummy, comprising:
 a body, wherein the body forms a bowl for receiving and holding a liquid, the bowl comprising substantially rigid side surfaces and a bottom surface, wherein the bowl is a transparent material; and
 a lid, wherein the lid comprises a resilient material adapted to be penetrated by a needle, and the lid is adapted to be in liquid-sealing contact with the body by the resilient material abutting against the side surfaces of the bowl.

2. The injection dummy of claim 1, wherein the side surfaces define an opening of the bowl, the opening being adapted to be closed by the lid and to face upwardly during injection of a liquid through the lid.

3. The injection dummy of claim 1, wherein the bowl only comprises only concave transitions between the side surfaces and concave transitions between the side surfaces and the bottom surface.

4. The injection dummy of claim 1, wherein the side surfaces extend substantially perpendicularly to the bottom surface.

5. The injection dummy of claim 1, wherein the body includes a recess that forms a spout connected to the bowl, and the spout is adapted to guide a liquid poured out of the bowl when the lid has been removed from the body.

6. The injection dummy of claim 5, wherein the lid comprises a graspable lip extending along at least a portion of the recess.

7. The injection dummy of claim 1, wherein at least a portion of the body is made from a transparent material.

8. The injection dummy of claim 1, wherein the body comprises a first outer friction surface, and at least a portion of the first outer friction surface forms an outer lateral surface of the body.

9. The injection dummy of claim 8, wherein the body comprises a second outer friction surface, and the second outer friction surface is arranged substantially opposite to the opening.

10. The injection dummy of claim 8, wherein a portion of the body comprises an outer elastic member that comprises at least one of the first outer friction surface and the second outer friction surface.

11. The injection dummy of claim 1, wherein the lid comprises a silicone material.

12. The injection dummy of claim 1, wherein the lid comprises a penetration area having a thickness of 1-2 millimeters.

13. The injection dummy of claim 1, wherein the lid comprises a rim that has a thickness of 2-4 millimeters.

14. The injection dummy of claim 13, wherein the rim includes at least one flange adapted to abut against the side surfaces of the bowl.

15. The injection dummy of claim 1, wherein the lid comprises a first position indicator, the body comprises a second position indicator, and the first and second position indicators are adapted to be aligned when the lid is in liquid-sealing contact with the body.

16. The injection dummy of claim 1, wherein the bowl is either glass or an acrylic plastic.

17. The injection dummy of claim 1, wherein the bowl is a thermoplastic material.

* * * * *